United States Patent
Airey et al.

(10) Patent No.: US 6,454,036 B1
(45) Date of Patent: Sep. 24, 2002

(54) AUTONOMOUS VEHICLE NAVIGATION SYSTEM AND METHOD

(75) Inventors: Donald Roy Airey, Bolton; Herman Servatius, Worcester, both of MA (US)

(73) Assignee: 'Bots, Inc., Bolton, MA (US)

( * ) Notice: Subject to any disclaimer, the term of this patent is extended or adjusted under 35 U.S.C. 154(b) by 0 days.

(21) Appl. No.: 09/571,761

(22) Filed: May 15, 2000

(51) Int. Cl.$^7$ .............................. B60T 7/16; G01C 22/00
(52) U.S. Cl. ........................................ 180/167; 701/25
(58) Field of Search ................................ 180/167, 168, 180/169; 701/23, 25, 24, 201, 202, 207, 208, 216, 210; 318/587, 139; 73/382 R, 382 G, 490, 178 R; 324/345, 346, 324, 326, 220, 221; 175/26

(56) References Cited

U.S. PATENT DOCUMENTS

| | | | |
|---|---|---|---|
| 3,699,316 A | * 10/1972 | Lopes, Jr. .................... 701/220 |
| 3,789,351 A | * 1/1974 | Feldman et al. ............. 340/988 |
| 4,133,404 A | 1/1979 | Griffin .......................... 327/12 |
| 4,470,119 A | * 9/1984 | Hasebe et al. ............... 364/449 |
| 4,677,562 A | * 6/1987 | Uota et al. ................... 364/449 |
| 4,688,176 A | * 8/1987 | Hirata ....................... 73/178 R |
| 4,694,639 A | 9/1987 | Chen et al. .................. 250/202 |
| 4,772,832 A | * 9/1988 | Okazaki et al. .............. 701/23 |
| 4,890,233 A | * 12/1989 | Ando et al. ................. 701/300 |
| 4,919,224 A | 4/1990 | Shyu et al. .............. 56/10.2 R |
| 5,007,234 A | 4/1991 | Shurman et al. ............ 180/401 |
| 5,155,684 A | 10/1992 | Burke et al. ................. 318/587 |
| 5,163,273 A | 11/1992 | Wojkowski et al. ........ 180/168 |
| 5,272,639 A | * 12/1993 | McGuffin .................... 701/200 |
| 5,444,965 A | 8/1995 | Colens ....................... 56/10.21 |
| 5,777,785 A | 7/1998 | Ishikawa ............... 56/DIG. 15 |
| 5,838,562 A | 11/1998 | Gudat et al. ................. 180/167 |
| 5,925,080 A | * 7/1999 | Shimbara et al. ............. 701/23 |
| 5,974,347 A | 10/1999 | Nelson ........................ 180/168 |
| 5,986,583 A | * 11/1999 | Nakano et al. ............. 340/988 |
| 6,006,161 A | * 12/1999 | Katou ......................... 701/212 |
| 6,012,002 A | * 1/2000 | Tapping et al. ............... 701/35 |
| 6,212,476 B1 | * 4/2001 | Noy et al. ....................... 702/9 |
| 6,240,368 B1 | * 5/2001 | Kreft .......................... 701/214 |

* cited by examiner

Primary Examiner—Brian L. Johnson
Assistant Examiner—G B Klebe
(74) Attorney, Agent, or Firm—Mirick, O'Connell, DeMallie & Lougee, LLP (57) ABSTRACT

The invention allows an automated vehicle to reliably and repeatedly navigate any arbitrary area or path after being trained by an operator. This invention uses the Earth's magnetic and gravitational fields for directional vectors and uses optical shaft encoders mounted on a non-driving wheel to accurately measure the distance traveled. These sensory inputs are sufficient to accurately locate the vehicle in three-dimensional space and can be compared against a stored map to generate the navigational signal. Training the vehicle involves storing this sensory information in a computerized log as an operator moves the vehicle over the target area. Once the vehicle has been trained, it is able to recognize and navigate the terrain without the need for artificial landmarks or human intervention.

18 Claims, 6 Drawing Sheets

AUTONOMOUS VEHICLE NAVIGATION SYSTEM AND METHOD

FIELD OF THE INVENTION

The invention pertains to a self-contained navigation system that can be used by self-propelled, fully automatic vehicles. As such, it is not intended as a complete solution but as a critical component of a larger system. The disclosed invention allows automated machines to do such simple, repetitive tasks as lawn mowing, snow removal, excavation, surveying, sentry duty and mine sweeping. The vehicle must be trained to execute the intended task, but can operate unattended thereafter.

BACKGROUND OF THE INVENTION

Autonomous mobile devices have been fashioned with a variety of techniques. All must solve the problem of traversing a terrain efficiently and accurately.

Many devices are specifically adapted for highly conditioned environments, e.g. building corridors, and assume, say, that the device is moving on a flat level surface, that the work area is bounded walls, or other such cues. Devising autonomous vehicles that work outdoors in a natural environment is more challenging.

Several categories of autonomous vehicles rely on conditioning the environment in the target area of the device with navigational cues.

An early outdoors model (U.S. Pat. No. 4,133,404, Griffin, 1979) is an autonomous lawn mowing device which utilizes optical sensors to detect the cut/uncut lawn boundary, and uses this boundary as a navigation tool. Beyond the obvious limitation that the cut/uncut boundary must be well defined, this device requires that the boundary of the lawn to be cut manually previous to each use. A refinement of this method (U.S. Pat. No. 5,007,234, Shurman, 1991) which, however, has the same limitations, is to detect the cut/uncut boarder via the resistance of the lawn to cutting (motor speed). There is also a slow-moving solar-powered version (U.S. Pat. No. 5,444,965, Colens, 1995) which requires the mower to be continuously present in the yard to be mowed. These devices are application specific, in other words, the navigational cue is derived from the purpose of the vehicle.

A more general-purpose method of environment conditioned guidance (U.S. Pat. No. 4,777,785, Rafaels, 1988) depends on having a fixed array of transmitters or beacons pre-positioned in the target area. The number of required transmitters was reduced to three (U.S. Pat. No. 5,974,347, Nelson, 1999) in a version in which the vehicle followed a programmed path of position points. Maintenance of the system is a problem whether the transmitters are left in place between device operations, or are reinstalled prior to each use.

Another common method of environment conditioned guidance is (U.S. Pat. No. 5,163,273, Wojtkowski, 1992) to have the vehicle follow a buried wire. This method entails a large capital cost and yields little flexibility. A version (U.S. Pat. No. 4919,224) with only a guide wire around the boundary of the operational area has less installation cost, but at the expense of efficiency of traversal. Buried metal objects have also been used by Noonan et al. (U.S. Pat. No. 4919,224) as positioning and turn guides.

All these methods involve installation of permanent structures. In general, if the environment is not to be conditioned, then devising an autonomous vehicle that functions outdoors in a natural environment represents another level of complexity, since the area of operation is fundamentally three dimensional. Specifically, the motion space of the vehicle is two dimensional, being confined by gravity to the earth's surface, while the navigation space is three dimensional, with an additional two dimensional orientation space.

A device which depends only on the motion space is possible, but prone to error. Chen (U.S. Pat. No. 4,694,639, 1987) offers a simple autonomous lawn mower with no external apparatus and no sensors. The mower follows a learning track made on paper tape. Since no provision is made for error correction, this version requires exact propositioning and even then would be restricted to a very small area of operation.

The autonomous vehicle in a non-conditioned environment must have the ability to 1. determine its current position
2. determine its desired position
3. determine how to move during the next movement segment to effect the desired change.

Several modern systems, for instance Gudat et al. (U.S. Pat. No. 5,838,562, 1998), use a Global Positioning System for navigation. However, even the best Global Positioning System is only accurate to about 5 meters. Good enough to know where you are to within a city block, but not good enough to avoid obstacles or repeat a path with any accuracy.

Another expensive and complicated solution is to use computer vision, for example (U.S. Pat. No. 5,155,684 Burke, 1992). Vision based systems have trouble with atmospheric conditions. What might appear as a sharp point of light on a cold night is a fuzzy patch of light on a hazy summer afternoon. The haze caused by humidity can make resolving landmarks with any accuracy very difficult.

IMPROVEMENT IN PRIOR ART

The invention uses three onboard sensor groups for navigation. The first of these sensors measures the distance traveled by the vehicle along its forward axis. The second and third sensor groups detect the earth's magnetic and gravitational fields. Because the orientation sensors make use of naturally occurring phenomena, this invention does not require externally placed emitters or buried objects, or environmental conditioning of any kind. The invention is also an improvement on vision based systems because the relatively rugged and inexpensive sensor configuration is sufficient for training and normal operation of the vehicle. Once the sensor information is collected, the on-board computer needs only a few simple, linear mathematical operations to know the vehicle's precise location in three dimensions at all times. Training the vehicle is no more difficult than mowing a lawn. The invention is more flexible than designs that use artificial landmarks and is considerably less complicated and more reliable than vision based systems.

SUMMARY OF THE INVENTION

The invention is a means of navigation that allows a vehicle to autonomously repeat the path taught to it. The essential components are: a set of three sensors, a computer and a drive system. The vehicle must be trained to recognize the target path by an operator. After being trained, the vehicle can autonomously direct itself over the same path.

Mechanically, the invention has two independent driving wheels that are controlled by the computer. For balance and distance measurement, at least one non-driving wheel is needed. This wheel is attached to the chassis with a caster to give it two planes of freedom. The measurement of the rotation of this passive wheel is the basis for an exact measurement of the distance traveled by the vehicle. The driving wheels are subject to slipping and can't be use for this purpose. The exact configuration of wheels is unimportant as long as the platform is stable and the vehicle can turn effectively. The independent driving wheels effect forward, backward and rotational locomotion. The passive wheel has a set of two optical shaft encoders attached to it. An absolute shaft encoder measures the angle of the axis of the passive wheel with respect to the chassis. An incremental shaft encoder is mounted on the chassis and connected to the non-driving wheel's axis using a flexible shaft. An exact measurement of the distance traveled by the vehicle with respect to the ground is made by knowing the angle of the caster and the rotation of this wheel.

A three axis magnetometer measures the direction and magnitude of the Earth's magnetic field. That is, three magnetometers are positioned at orthogonal angles to provide a three dimensional vector that gives the direction of the naturally occurring field. It's not necessary that the sensors give the exactly direction to the magnetic North Pole. The important requirement is that the directional vector is constant and repeatable with respect to the Earth. This obviates the need for any special calibration.

A three axis accelerometer measures the direction and magnitude of the force of gravity. It is constructed from a set of three accelerometers positioned at orthogonal angles. Like the magnetometers, the important aspect of this sensor is that it gives a repeatable vector that is constant with respect to Earth. An unwanted side-effect of accelerometers for this application is that they also measure any inertial change in the vehicle. However, using the information from the optical shaft encoders attached to the vehicle's wheels, the effects of inertial changes can be cancelled from the sensor yielding a constant gravitational vector.

The autonomous vehicle is trained by an operator who directs the motion either by actuators mounted directly on the device or by using a remote control. This can be over any arbitrary terrain. For the algorithm to work, the vehicle must have a common starting point for both training and unattended operation. This marker can be as simple as a visual indicator on the ground or an iron bar buried in the ground that the vehicle detects with the magnetometers. During the training pass, the vehicle collects the sensory information at regular sampling intervals and stores this data in a sensor log. The sensor log contains: the distance traveled since the last sample, the three components of the magnetic vector and the three components of the gravitational vector. This stored information is sufficient to construct a three dimensional map of the subject terrain using relatively simple linear math formulas.

During unattended operation of the vehicle, the same formulas are used with the current sensor data to calculate the current location. The difference between the internal map and the current location generates an error signal. This signal is used to direct the proportion and direction of the power delivered to the driving wheels, keeping the vehicle on the predetermined path.

DETAILED DESCRIPTION OF PREFERRED EMBODIEMENT

Figure 1:
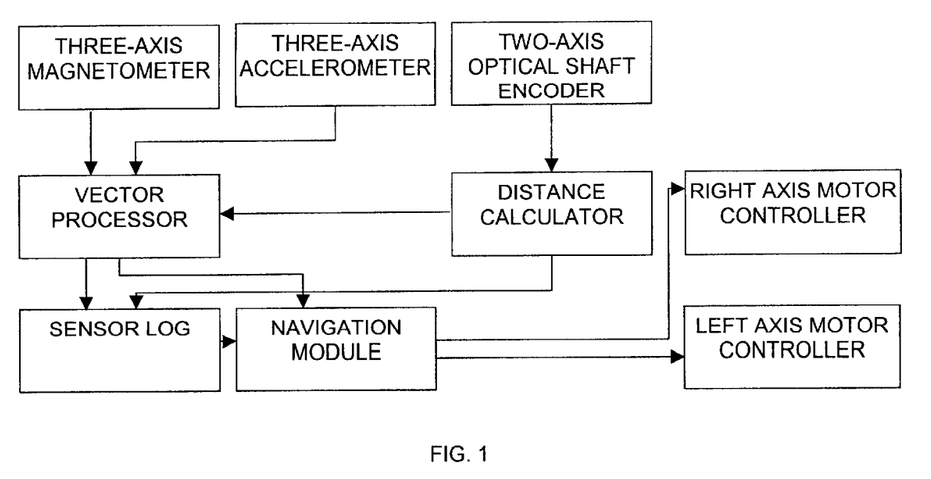
FIG. 1 is a block diagram that shows the major system components of the invention and the flow of information starting with the sensors and ending in a velocity signal to the motor drives.
Figure 2:
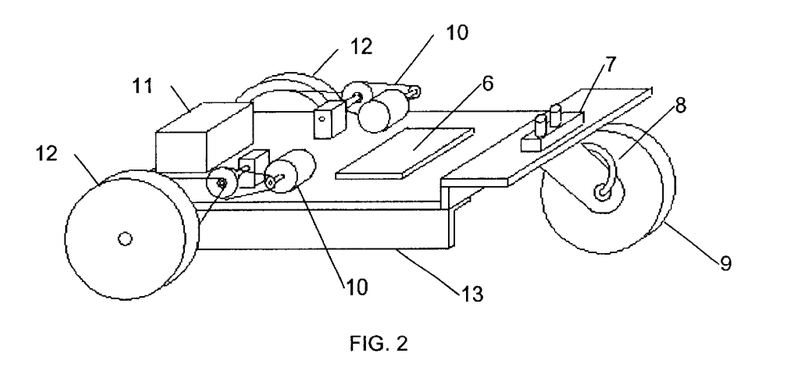
FIG. 2 is a drawing that demonstrates the minimum mechanical requirements of the invention. This drawing is represents one possible configuration of a system using the disclosed invention. Others are possible if they meet the minimum requirements.

FIG. 2 demonstrates the essential mechanical components of the vehicle. The chassis 13 provides the platform on which the driving wheels 12, the motors 10, the passive wheel 9, the computer and sensors 6, the power source 11 and the passive wheel's encoders 7 are mounted. Flexible shaft 8 allows the rotation of the passive wheel to turn an encoder mounted on the chassis.

Figure 3A:
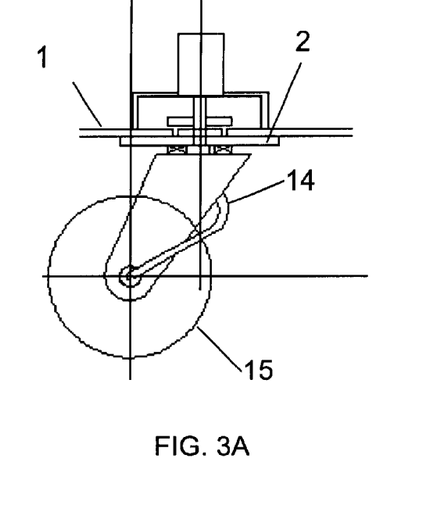
FIG. 3A is a side view of an embodiment of a passive wheel encoder design for the invention used to sense the distance traveled.
Figure 3B:
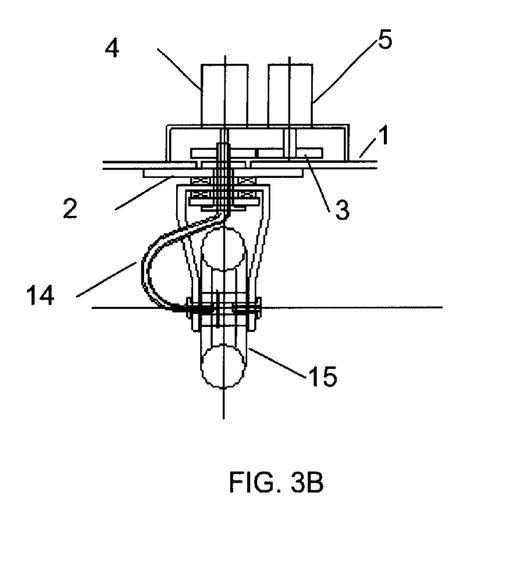
FIG. 3B shows more detail of the passive wheel encoder of FIG. 3A from the front.

The distance traveled by the vehicle can be measured any number of ways. One solution is demonstrated figures FIG. 3A and FIG. 3B. In this design, a flexible steel tube 14 is attached to the axle of a wheel 15 which is attached to the chassis 1 using a caster 2 mount. As the wheel turns, the flexible steel tube 14 turns an incremental shaft encoder 4 mounted above the gear assembly 3. The incremental shaft encoder 4 keeps a highly accurate measurement of the rotation of the wheel 15. Since the wheel can swivel on the caster 2, its rotation doesn't always translate into forward motion of the vehicle. In order to use the information in from the incremental shaft encoder 4, the angle of the wheel with respect to the vehicle body must be known. Sensing this requires an absolute shaft encoder 6 attached using a gear assembly 3 mounted on the caster 2. The value from the absolute shaft encoder 5 is proportional to the angle that the wheel 15 makes with respect to the chassis 1. This value can be multiplied by a constant, k, to yield the angle in radians. If the distance traveled by the wheel is $\Delta x$, and the angle of the wheel is $\Phi$, then the distance, $\Delta d$, traveled by the chassis along the forward axis is:

$$\Delta d = \Delta x \times \cos(k \times \Phi).$$

Figure 4A:
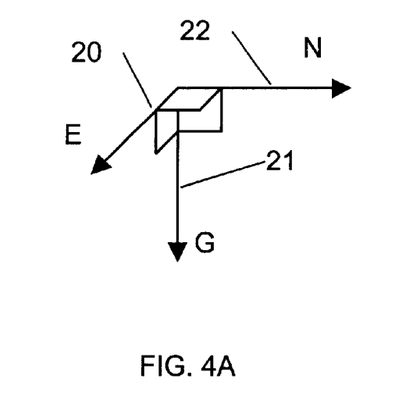
FIG. 4 shows the robot coordinate system of the invention and how it relates to the world coordinate system.
Figure 4B:
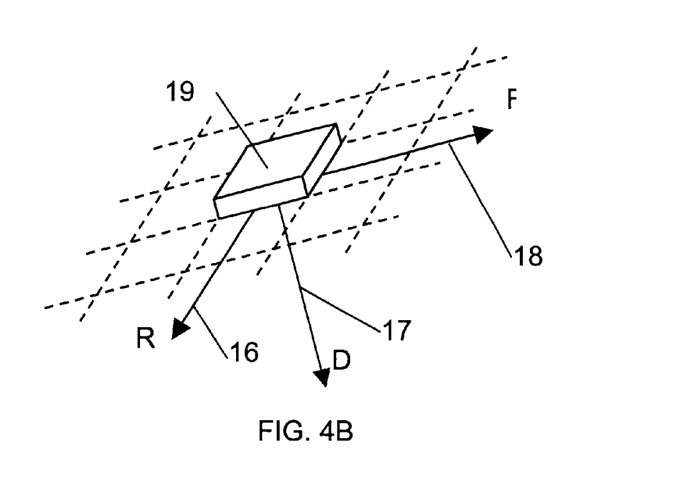

In the following discussion, a coordinate system is an ordered triple of three linearly independent vectors, called basis vectors. In FIG. 4 we see the two coordinate systems which are relevant to the invention. The world coordinate system (FIG. 4A), consists of three unit vectors, N 22, E 20 and G 21, nominally indicating North, East, and the direction of the Earth's center, respectively. The second coordinate system (FIG. 4B), is the vehicle coordinate system, also consisting of three vectors. The unit vector, F 18, points in the forward direction of the chassis 19. The unit vector, R 16, points to the right of vector F 18 and unit vector, D 17, points straight down from the chassis 19. The world coordinate system is fixed, while the vehicle coordinate system changes from moment to moment as the vehicle travels through the world. Mathematically, the most important concept behind this invention is its ability to relate the subjective vehicle coordinate system to an objective world coordinate system. Two non-collinear vectors—which are fixed with respect to the world coordinate system—are needed for this translation.

Figure 5:
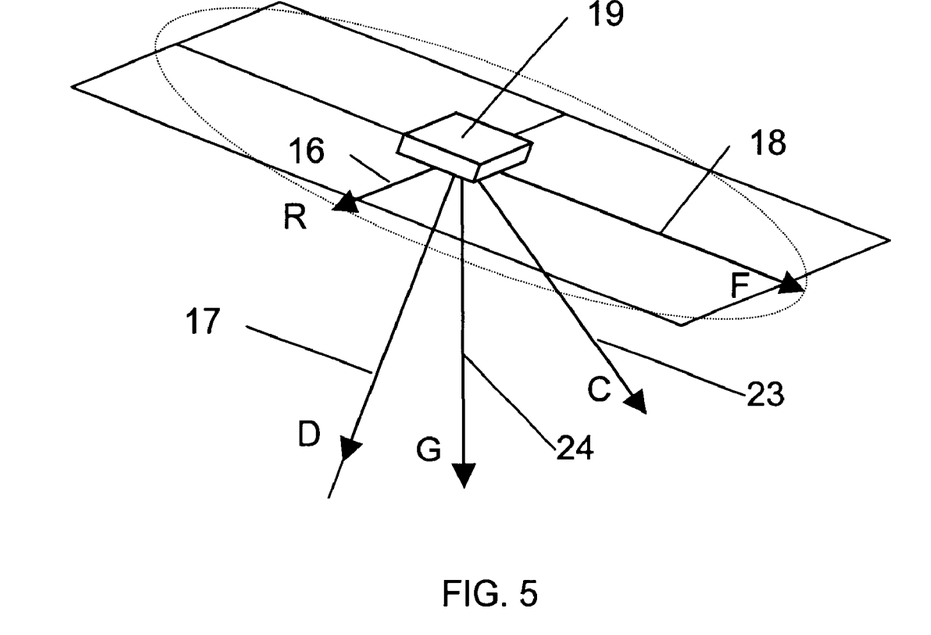
FIG. 5 depicts a vehicle using the invention and its basis set (coordinate system) and how the magnetic field and gravitational vectors appear to the vehicle.

The first vector is provided by the Earth's magnetic field, which has a direction and magnitude. The second is the Earth's gravitational field which also has a direction and magnitude. Both fields are easily measured by conventional transducers. FIG. 5 shows how the earth's magnetic and gravitational field vectors, C 23 and G 24 respectively, are seen in the context of the vehicle. All input vectors are normalized when they are read from the sensors so the magnitude of the vector is irrelevant to navigation; only the direction is important. A limitation that is worth noting as an illustration is that the invention will not work at the North or South Poles where the magnetic and gravitational fields are collinear.

Figure 6:
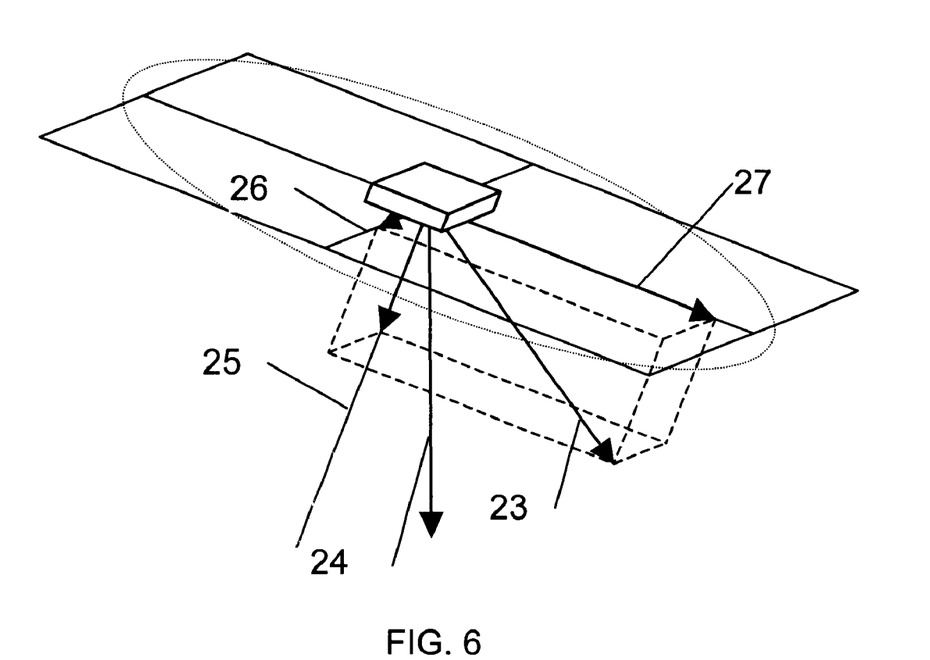
FIG. 6 shows how the magnetic field generated by the North Pole is projected onto and is measured by the sensors of the invention.

Three magnetometers are mounted at right angles to each other to measure the scalar components of the magnetic field on the vehicle's coordinate system. Each of the sensors measures the projection of the field along the axis on which it is mounted. FIG. 6 shows how the magnetic vector 23 is decomposed into a forward vector 27, a right vector 26 and a downward vector 25 by the sensors.

Figure 7:
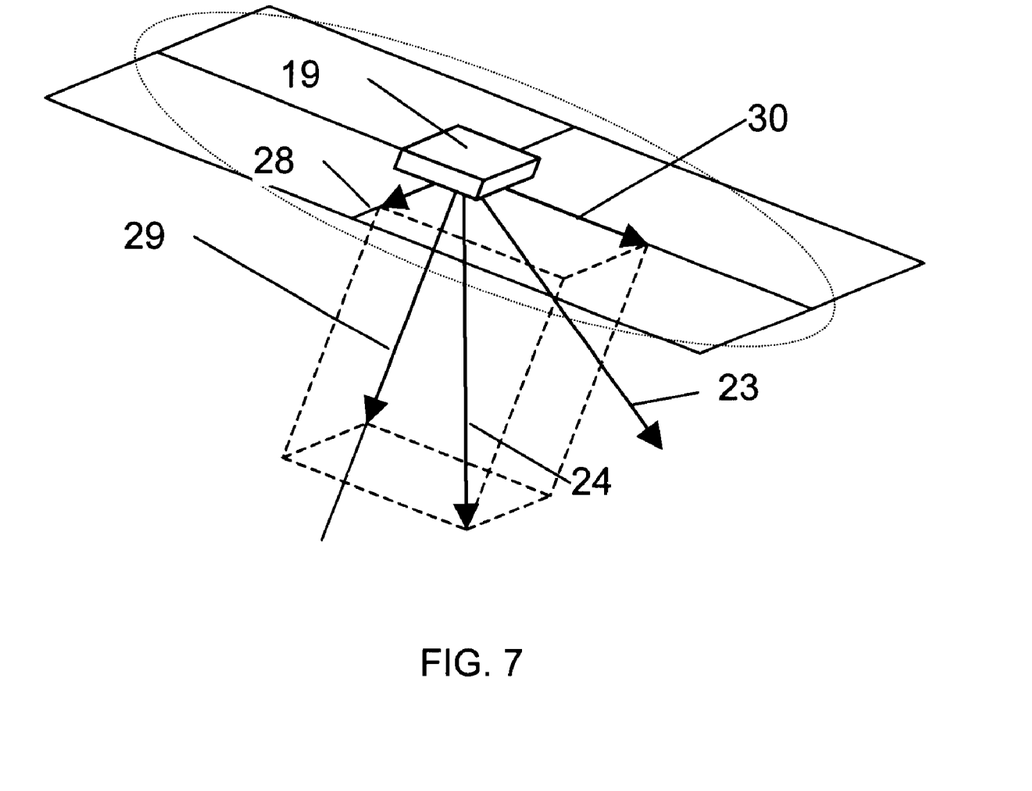
FIG. 7 shows how the gravitational field is projected onto and is measured by the sensors of the invention.

The gravitational field is measured the same way by a different set of sensors. FIG. 7 shows how the forward 30, right 28 and downward 29 components of the gravitational vector 24 are measured by the vehicle. These sensors will also measure the inertial changes in the vehicle. The optical shaft encoders 4, 5 on the passive rear wheel 15 can accurately measure the change in acceleration of the vehicle. These inertial forces can be subtracted from the gravitational forces yielding a constant vector to the center of the Earth.

Figure 8:
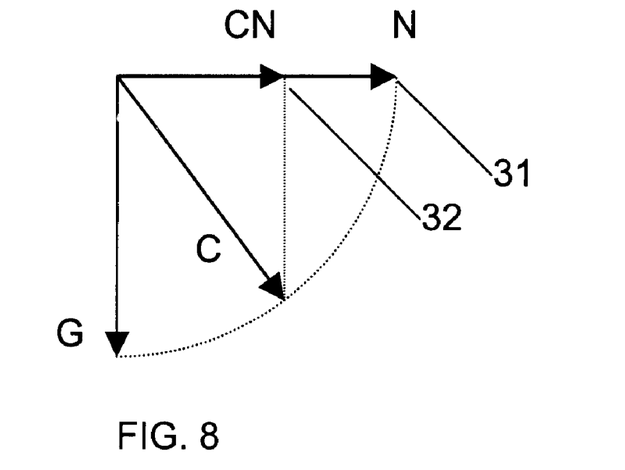
FIG. 8 shows graphically how the components of the Basis Change Matrix used in the invention are derived.

The translation from the sensor information on the vehicle to an absolute world values is accomplished by constructing a Basis Change Matrix. Conceptually, this matrix is a World Coordinate System described in terms of the Vehicle Coordinate System. The first step is to select a world vector as the starting point. FIG. 8 shows how a vector, CN 32, that points to magnetic north and is at a right angle to the gravitational vector is found using The Gram-Schmidt Process:

$$CN = C - (C \cdot G)G.$$

This vector is converted to a unit vector N 31 pointing north:

$$N = \frac{CN}{\sqrt{(CN \cdot CN)}}.$$

The third matrix component needed to describe the world coordinate system is a simple cross-product of the gravity and north vectors:

$$E = G \times N.$$

This vector points, nominally, in the eastern direction and is orthogonal to both the gravity and north 31 vectors. The basis change matrix is formed easily from these values:

$$M = \begin{bmatrix} [ & N & ] \\ [ & E & ] \\ [ & G & ] \end{bmatrix} = \begin{bmatrix} \begin{bmatrix} F \end{bmatrix} \begin{bmatrix} R \end{bmatrix} \begin{bmatrix} D \end{bmatrix} \end{bmatrix}.$$

This matrix is constructed from values retrieved from the vehicle's sensors. It is used to translate the vehicle's forward motion, $\Delta d$, into world coordinates. The rows of matrix M represent the vectors of the World Coordinate System in terms of the vehicle's coordinate system. The columns represent each of the vehicles basis vectors: the first column represents the forward axis, the second column is the right axis and the last column is the down axis. To calculate the change in three dimensions, $\Delta X$, of the vehicle's position, multiply the distance traveled along the forward axis, $\Delta d$, by the first column of matrix M:

$$\Delta X = F \times \Delta d.$$

Figure 9:
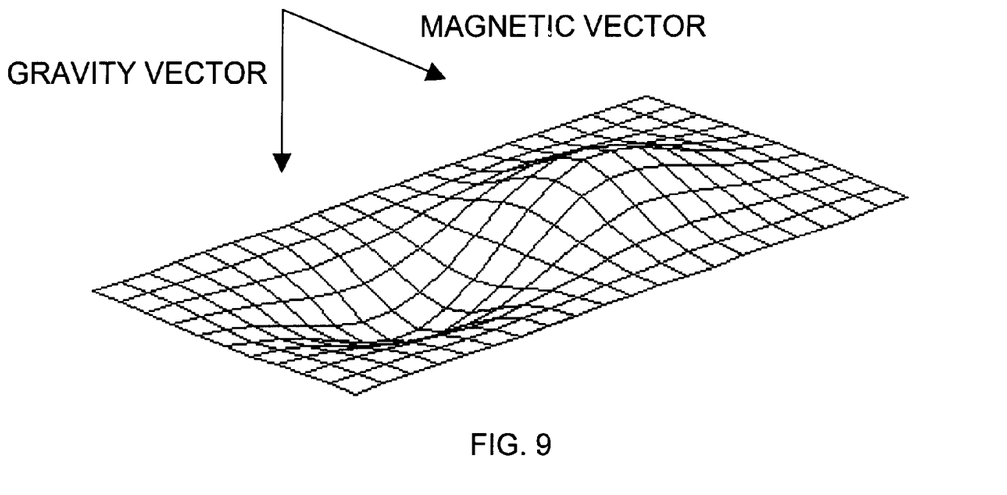
FIG. 9 is a depiction of a virtual terrain used to generate the sensor log for the invention.
Figure 10:
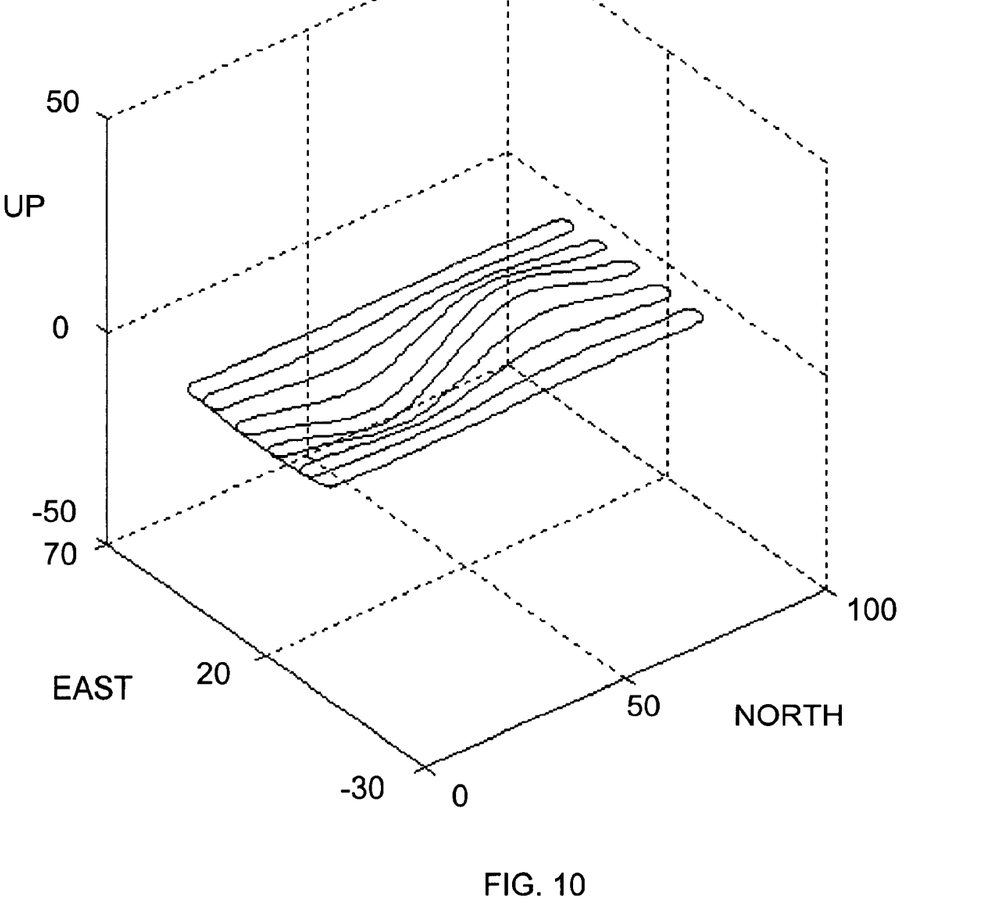
FIG. 10 is a reconstructed wire-frame representation of the virtual field stored in the sensor log for the invention.

For example, suppose the vehicle is traveling to the north-east straight up an incline of 45 degrees, and, for simplicity, that the compass vector points due north. The vehicle will measure the gravity vector, G, as [−0.7, 0.0, 0.7] and the magnetic field vector, C, as [0.5, −0.7, 0.5]. The orthogonal unit vector to the north, N, is computed as [0.5, −0.,7, 0.5]. The eastern facing unit vector, E, is the cross-product of G and N: [0.5, 0.7, 0.5]. For this example, we'd like to know the change in three dimensions after the vehicle has traveled 2 feet. The basis change matrix will be:

$$M = \begin{bmatrix} 0.5 & -0.7 & 0.5 \\ 0.5 & 0.7 & 0.5 \\ -0.7 & 0.0 & 0.7 \end{bmatrix}.$$

from which we find F=[0.5, 0.5, −0.7]. Multiplying by the distance traveled, $\Delta d=2$ feet, the change in position is calculated to be [1.0, 1.0, −1.4] feet. A more complex test of the formulas is demonstrated in FIG. 9 and FIG. 10. In FIG. 9, a virtual three-dimensional playing field is constructed using a simple mathematical formula. In this virtual world, the sensor values that a real vehicle might register when traveling over the same terrain as shown in Table 1 have been simulated.

TABLE 1

| Distance | Magnetic Vector | | | Gravitational Vector | | |
|---|---|---|---|---|---|---|
| Traveled | Forward | Left | Down | Forward | Left | Down |
| 0.00 | 0.62 | 0.41 | −0.67 | −0.18 | −0.08 | 0.98 |
| 1.25 | 0.62 | 0.41 | −0.67 | −0.18 | −0.09 | 0.98 |
| 1.25 | 0.62 | 0.42 | −0.67 | −0.18 | −0.09 | 0.98 |
| . | . | . | . | . | . | . |
| . | . | . | . | . | . | . |
| . | . | . | . | . | . | . |
| 0.49 | 0.33 | 0.67 | −0.67 | −0.11 | −0.17 | 0.98 |
| 0.49 | 0.46 | 0.59 | −0.67 | −0.14 | −0.14 | 0.98 |
| 0.49 | 0.56 | 0.48 | −0.67 | −0.17 | −0.11 | 0.98 |

Table 1 above shows the components of the sensor log. The actual values were collected from the virtual sensors as a mathematically modeled vehicle traveled over the field shown in FIG. 9. Finally, FIG. 10 shows a wire-frame reconstruction of the data found in Table 1 when it is integrated using the formulas described above. The sensor values collected in the log are sufficient to map an arbitrary, three-dimensional space. When this stored map is compared against the sensor values at a later time, the difference in three dimensions can be calculated and the vehicle can correct its heading to follow the original path.

Although specific features of the invention are shown in some drawings and not others, this is for convenience only, as the features may be combined in manners apparent to those skilled in the art without departing from the following claims.

Other embodiments will occur to those skilled in the art and are within the scope of the claims.

What is claimed is:

1. A system for guiding a powered vehicle moving across a surface, comprising:
   a three-axis magnetometer with three magnetometers sensing along mutually orthogonal axes, for sensing the three components of the earth's magnetic field;
   a three-axis accelerometer with three accelerometers sensing along mutually orthogonal axes, for sensing the three components of the earth's gravitational field;
   means for determining the distance traveled by said vehicle; and
   means, responsive to said three-axis magnetometer and said three-axis accelerometer, and to said means for determining, for guiding the vehicle.

2. The system of claim 1 wherein said means for determining the distance traveled comprises means for measuring the rotation of a passive wheel on the vehicle.

3. The system of claim 2 wherein said means for measuring the distance traveled further comprises means for measuring the angular motion of said passive wheel with respect to said vehicle.

4. The system of claim 2 wherein said means for measuring rotation comprises a flexible shaft coupled to said passive wheel, and means for determining rotation of said flexible shaft.

5. The system of claim 3 wherein said means for measuring the angular motion of said passive wheel with respect to said vehicle comprises an absolute shaft encoder.

6. The system of claim 1 wherein said vehicle includes at least two independently controllable driven devices.

7. The system of claim 6 wherein said means for guiding the vehicle includes means for controlling the speed and direction of motion of each said driven device.

8. The system of claim 7 where in said driven devices comprise wheels.

9. A method of guiding a powered vehicle moving across a surface, comprising:
   a step of sensing the earth's magnetic field with a three-axis magnetometer with three magnetometers sensing along mutually orthogonal axes, for sensing the three components of the earth's magnetic field;
   a step of sensing the earth's gravitational field with a three-axis accelerometer with three accelerometers sensing along mutually orthogonal axes, for sensing the three components of the earth's gravitational field;
   a step of determining the distance traveled by said vehicle; and
   in response to both of said sensing steps, and to said determining step, guiding the vehicle.

10. The method of claim 9 further comprising training said vehicle to traverse a path along the surface.

11. The method of claim 10 further including designating a starting location for the vehicle.

12. The method of claim 11 wherein designating a starting location for the vehicle comprises fixing a location for starting both the training and the later traversing.

13. The method of claim 10 wherein training said vehicle comprises directing said vehicle along a path on the surface.

14. The method of claim 10 wherein training said vehicle further comprises periodically during said training saving in an electronic memory information representing the distance traveled, and information representing the magnetic and gravitational vectors.

15. The method of claim 14 wherein training said vehicle further comprises creating from said saved information a map of the surface.

16. The method of claim 15 wherein guiding said vehicle comprises determining the current location of said vehicle, comparing that to said map, and generating an error signal in response.

17. The method of claim 16 wherein said vehicle includes at least two independently controllable driven devices.

18. The method of claim 17 wherein guiding the vehicle includes controlling the speed and direction of motion of each said driven device in response to said error signal.

* * * * *